(12) United States Patent
Li

(10) Patent No.: US 7,764,707 B2
(45) Date of Patent: Jul. 27, 2010

(54) METHOD FOR ADAPTIVE QUADRATURE AMPLITUDE MODULATION SIGNAL CONSTELLATION REMAPPING FOR DATA PACKET RETRANSMISSIONS

(75) Inventor: Yingxue Li, Exton, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 508 days.

(21) Appl. No.: 11/686,994

(22) Filed: Mar. 16, 2007

(65) Prior Publication Data

US 2007/0268814 A1 Nov. 22, 2007

Related U.S. Application Data

(60) Provisional application No. 60/783,644, filed on Mar. 17, 2006.

(51) Int. Cl.
*H04L 1/18* (2006.01)
(52) U.S. Cl. .................. 370/465; 370/207; 714/748
(58) Field of Classification Search .................. None
See application file for complete search history.

(56) References Cited

U.S. PATENT DOCUMENTS

| | | | |
|---|---|---|---|
| 6,151,296 A | 11/2000 | Vijayan et al. | |
| 7,672,394 B2 * | 3/2010 | Duan et al. | 375/295 |
| 2003/0072292 A1 * | 4/2003 | Yoon et al. | 370/342 |
| 2003/0081690 A1 | 5/2003 | Kim et al. | |
| 2004/0049725 A1 * | 3/2004 | Golitschek et al. | 714/749 |
| 2004/0221219 A1 * | 11/2004 | Von Elbwart et al. | 714/748 |
| 2005/0108610 A1 * | 5/2005 | Kim et al. | 714/748 |
| 2005/0193307 A1 * | 9/2005 | Wengerter et al. | 714/749 |
| 2006/0036922 A1 | 2/2006 | Hong et al. | |
| 2006/0056380 A1 * | 3/2006 | Mitsugi et al. | 370/349 |

FOREIGN PATENT DOCUMENTS

| | | |
|---|---|---|
| EP | 1 427 128 | 6/2004 |
| EP | 1 667 391 | 6/2006 |
| EP | 1667391 | 6/2006 |
| WO | 2005/034458 | 4/2005 |

OTHER PUBLICATIONS

3GPP, "3$^{rd}$ Generation Partnership Project; Technical Specification Group Radio Access Network; Multiplexing and Channel Coding (FDD) (Release 6)," 3GPP TS 25.212 V6.6.0, (Sep. 2005).

(Continued)

*Primary Examiner*—Huy D Vu
*Assistant Examiner*—Benjamin Lamont
(74) *Attorney, Agent, or Firm*—Volpe And Koenig, P.C.

(57) ABSTRACT

A simplified QAM signal constellation symbol-wise remapping scheme for data packet retransmissions to improve performance at a high coding rate. The simplified QAM signal constellation symbol-wise remapping scheme takes advantage of the separate I and Q labeling bits in a QAM signal to reduce the complexity of a receiving node. A method for adaptive switching between bit-wise and symbol-wise constellation remapping for data packet transmissions according to channel coding rate to achieve optimum performance across the range of channel coding rates.

8 Claims, 2 Drawing Sheets

OTHER PUBLICATIONS

3GPP, "3rd Generation Partnership Project; Technical Specification Group Radio Access Network; Physical Layer Aspects for Evolved UTRA (Release 7)," 3GPP TR 25.814 V1.1.1, (Feb. 2006).
3GPP, "3rd Generation Partnership Project; Technical Specification Group Radio Access Network; Physical Layer Aspects for Evolved UTRA (Release 7)," 3GPP TR 25.814 V7.1.1, (Sep. 2006).
Dottling et al., "Incremental Redundancy and Bit-Mapping Techniques for High Speed Downlink Packet Access," IEEE Global Telecommunications Conference, vol. 7, pp. 908-912, (Dec. 2003).
Panasonic, "Enhanced HARQ Method with Signal Constellation Rearrangement," TSG-RAN Working Group 1 Meeting #19, TSGR1#19(01)0237, (Feb. 27-Mar. 2, 2001).
Samra et al., "Symbol Mapping Diversity Design for Multiple Packet Transmissions," IEEE Transactions on Communications, vol. 53, No. 5, pp. 810-817, (May 2005).
Gidlund, M. et al., "An Improved ARQ Scheme with Application to Multi-Level Modulation Techniques," International Symposium on Communications and Information Technologies 2004 (ISCIT 2004), Sapporo, Japan, Oct. 26-29, 2004, p. 975.
Third Generation Partnership Project, "Technical Specification Group Radio Access Network; Multiplexing and channel coding (FDD) (Release 1999)," 3GPP TS 25.212 V3.11.0 (Sep. 2002).
Third Generation Partnership Project, "Technical Specification Group Radio Access Network; Multiplexing and channel coding (FDD) (Release 4)," 3GPP TS 25.212 V4.6.0 (Sep. 2002).
Third Generation Partnership Project, "Technical Specification Group Radio Access Network; Multiplexing and channel coding (FDD) (Release 5)," 3GPP TS 25.212 V5.10.0 (Jun. 2005).
Third Generation Partnership Project, "Technical Specification Group Radio Access Network; Multiplexing and channel coding (FDD) (Release 6)," 3GPP TS 25.212 V6.6.0, (Sep. 2005).
Third Generation Partnership Project, "Technical Specification Group Radio Access Network; Multiplexing and channel coding (FDD) (Release 6)," 3GPP TS 25.212 V6.7.0 (Dec. 2005).
Third Generation Partnership Project, "Technical Specification Group Radio Access Network; Multiplexing and channel coding (FDD) (Release 6)," 3GPP TS 25.212 V6.10.0 (Dec. 2006).
Third Generation Partnership Project, "Technical Specification Group Radio Access Network; Multiplexing and channel coding (FDD) (Release 7)," 3GPP TS 25.212 V7.3.0 (Dec. 2006).
Third Generation Partnership Project, "Technical Specification Group Radio Access Network; Physical Layer Aspects for Evolved UTRA (Release 7)," 3GPP TS 25.814 V1.1.1, (Feb. 2006).
Third Generation Partnership Project, "Technical Specification Group Radio Access Network; Physical Layer Aspects for Evolved UTRA (Release 7)," 3GPP TR 25.814 V7.1.0, (Sep. 2006).
Dottling et al., "Incremental Redundancy and Bit-Mapping Techniques for High Speed Downlink Packet Access," IEEE Global Telecommunications Conference, vol. 7, pp. 908-912, (Dec. 2003).
Gidlund, M. et al., "An Improved ARQ Scheme with Application to Multi-Level Modulation Techniques," International Symposium on Communications and Information Technologies 2004 (ISCIT 2004), Sapporo, Japan, Oct. 26-29, 2004, p. 975.
Panasonic, "Enhanced HARQ Method with Signal Constellation Rearrangement," TSG-RAN Working Group 1 Meeting #19, TSGR1#19(01)0237, (Feb. 27 —Mar. 2, 2001).
Samra et al., "Symbol Mapping Diversity Design for Multiple Packet Transmissions," IEEE Transactions on Communications, vol. 53, No. 5, pp. 810-7, (May 2005).
Third Generation Partnership Project, "Technical Specification Group Radio Access Network; Multiplexing and channel coding (FDD) (Release 1999)," 3GPP TS 25.212 V3.11.0 (Sep. 2002).
Third Generation Partnership Project, "Technical Specification Group Radio Access Network; Multiplexing and channel coding (FDD) (Release 4)," 3GPP TS 25.212 V4.6.0 (Sep. 2002).
Third Generation Partnership Project, "Technical Specification Group Radio Access Network; Multiplexing and channel coding (FDD) (Release 5)," 3GPP TS 25.212 V5.10.0 (Jun. 2005).
Third Generation Partnership Project, "Technical Specification Group Radio Access Network; Multiplexing and channel coding (FDD) (Release 6)," 3GPP TS 25.212 V6.6.0, (Sep. 2005).
Third Generation Partnership Project, "Technical Specification Group Radio Access Network; Multiplexing and channel coding (FDD) (Release 6)," 3GPP TS 25.212 V6.7.0 (Dec. 2005).
Third Generation Partnership Project, "Technical Specification Group Radio Access Network; Multiplexing and channel coding (FDD) (Release 6)," 3GPP TS 25.212 V6.10.0 (Dec. 2006).
Third Generation Partnership Project, "Technical Specification Group Radio Access Network; Multiplexing and channel coding (FDD) (Release 7)," 3GPP TS 25.212 V7.3.0 (Dec. 2006).
Third Generation Partnership Project, "Technical Specification Group Radio Access Network; Physical Layer Aspects for Evolved UTRA (Release 7)," 3GPP TS 25.814 V1.1.1, (Feb. 2006).
Third Generation Partnership Project, "Technical Specification Group Radio Access Network; Physical Layer Aspects for Evolved UTRA (Release 7)," 3GPP TR 25.814 V7.1.0, (Sep. 2006).

* cited by examiner

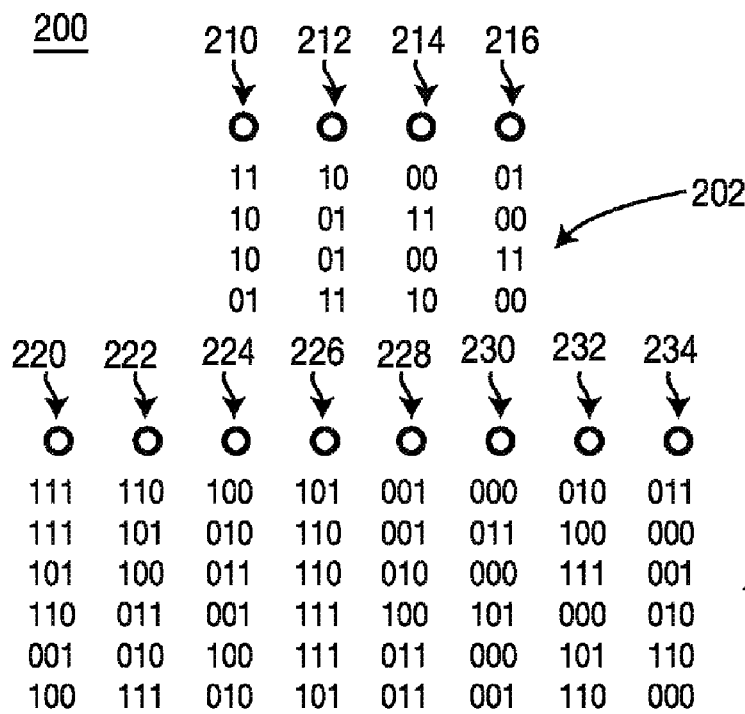
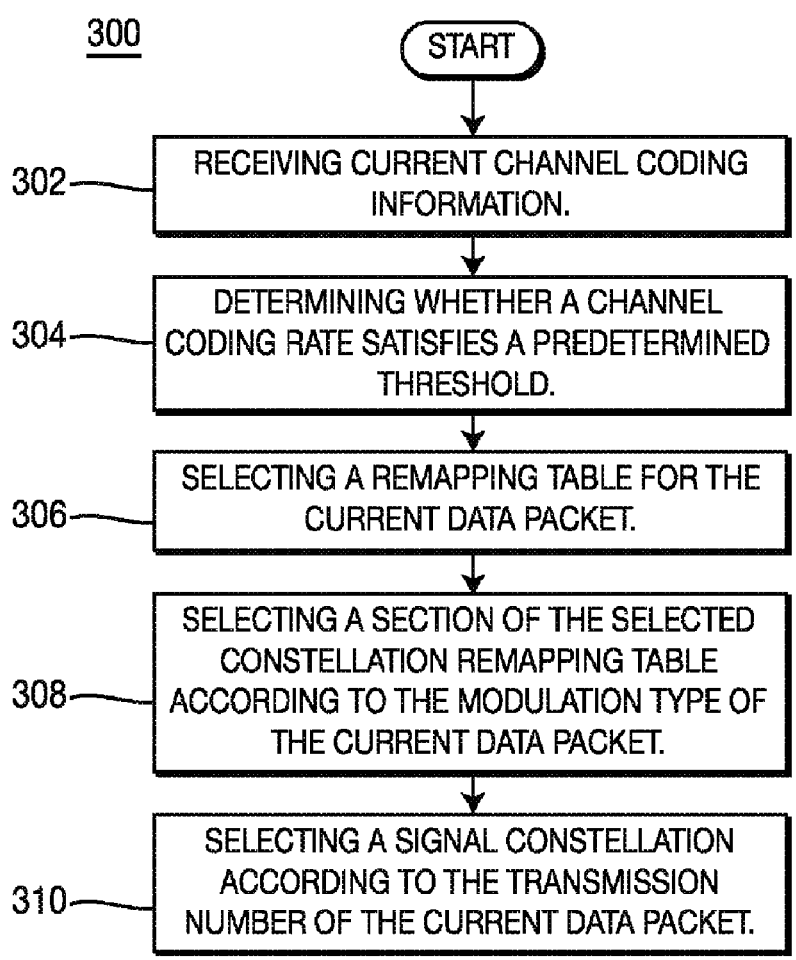
FIG. 2
FIG. 3

METHOD FOR ADAPTIVE QUADRATURE AMPLITUDE MODULATION SIGNAL CONSTELLATION REMAPPING FOR DATA PACKET RETRANSMISSIONS

CROSS REFERENCE TO RELATED APPLICATION

This application claims priority from U.S. Provisional Patent Application No. 60/783,644 filed Mar. 17, 2006 which is incorporated by reference as if fully set forth.

FIELD OF INVENTION

The present invention is related to digital data modulation in wireless communication systems. More particularly, the present invention is related to a method for adaptive quadrature amplitude modulation (QAM) signal constellation remapping during data packet retransmissions.

BACKGROUND

In digital data transmission, it is common practice to transmit an acknowledgement (ACK) signal from a receiver to a transmitter to indicate successful reception of a data packet. If a transmitter does not receive an ACK or receives a non-acknowledgement (NACK) signal during a defined time period, the data packet will be retransmitted.

Retransmitting a data packet provides an opportunity to improve the efficiency of the retransmission by using signaling diversity. For example, a data packet may be retransmitted on a different frequency to achieve frequency diversity or a data packet may be retransmitted on a different antenna to achieve spatial diversity. The efficiency of data packet retransmissions may also be improved by signaling different versions of redundancy bits.

Signal mapping diversity is a promising technique to improve the efficiency of data packet retransmissions. To achieve signal mapping diversity, the same bit sequence is mapped onto different signal points in a signal constellation when the modulation is higher than the quadrature phase shift keying (QPSK) in use. It is well known in the art that when modulating bits to symbols of higher order modulation, the reliability of those bits are not equal. The reliability of those bits depends on the location and/or the value of bits.

One scheme of 16 QAM and 64 QAM constellation remapping, proposed for 3GPP, aims to average the bias of bit reliability during data packet retransmission. In addition, a prior art proposal for 16 QAM has been adapted to high speed downlink packet access (HSDPA) standards. This remapping technique is referred to as bit-wise remapping. Bit-wise remapping is effective when a system employs strong channel coding. However, bit-wise remapping performs poorly when a system employs weak channel coding because weak channel coding causes a high code rate and results in a small number of redundancy bits.

Another scheme of signal remapping aims to maximize the minimum combined squared Euclidean distance (CSED) across multiple retransmissions. This criterion effectively minimizes raw symbol error rate. This remapping technique is referred to as symbol-wise remapping. Symbol-wise remapping performs best when a system employs weak channel coding because the system approaches an uncoded system.

Prior art symbol-wise remapping techniques fail to take advantage of the fact that the I and Q labeling bits of a QAM signal are separable. Therefore, a new mechanism that takes advantage of separate I and Q labeling bits in a QAM signal and reduces the complexity of symbol-wise remapping is desired. Further, it has been shown that a bit-wise remapping scheme performs best when the system uses strong channel coding and a symbol-wise remapping scheme performs best when the system uses weak channel coding. Therefore, a method and apparatus for adaptive signal remapping according to channel coding is desired to improve overall performance compared to remapping schemes using a single technique and to reduce the complexity of a receiver.

SUMMARY

The present invention is related to a simplified symbol-wise QAM signal constellation remapping scheme for data packet retransmissions to improve performance at a high coding rate. The simplified symbol-wise QAM signal constellation remapping scheme takes advantage of the separate I and Q labeling bits in a QAM signal to reduce the complexity of a receiving node. The present invention is also related to a method for adaptive switching between bit-wise and symbol-wise constellation remapping according to a channel coding rate to achieve optimum performance across the range of channel coding rates.

BRIEF DESCRIPTION OF THE DRAWING(S)

A more detailed understanding of the invention may be had from the following description of a preferred embodiment, given by way of example and to be understood in conjunction with the accompanying drawings wherein:

FIG. 2 is an exemplary symbol-wise constellation remapping for 16 QAM and 64 QAM modulation on I labeled bits implemented by the system of FIG. 1; and FIG. 3 is a flow diagram of an adaptive QAM signal constellation remapping process for data packet retransmissions implemented by the system of FIG. 1.

DETAILED DESCRIPTION OF THE PREFERRED EMBODIMENTS

Figure 1:
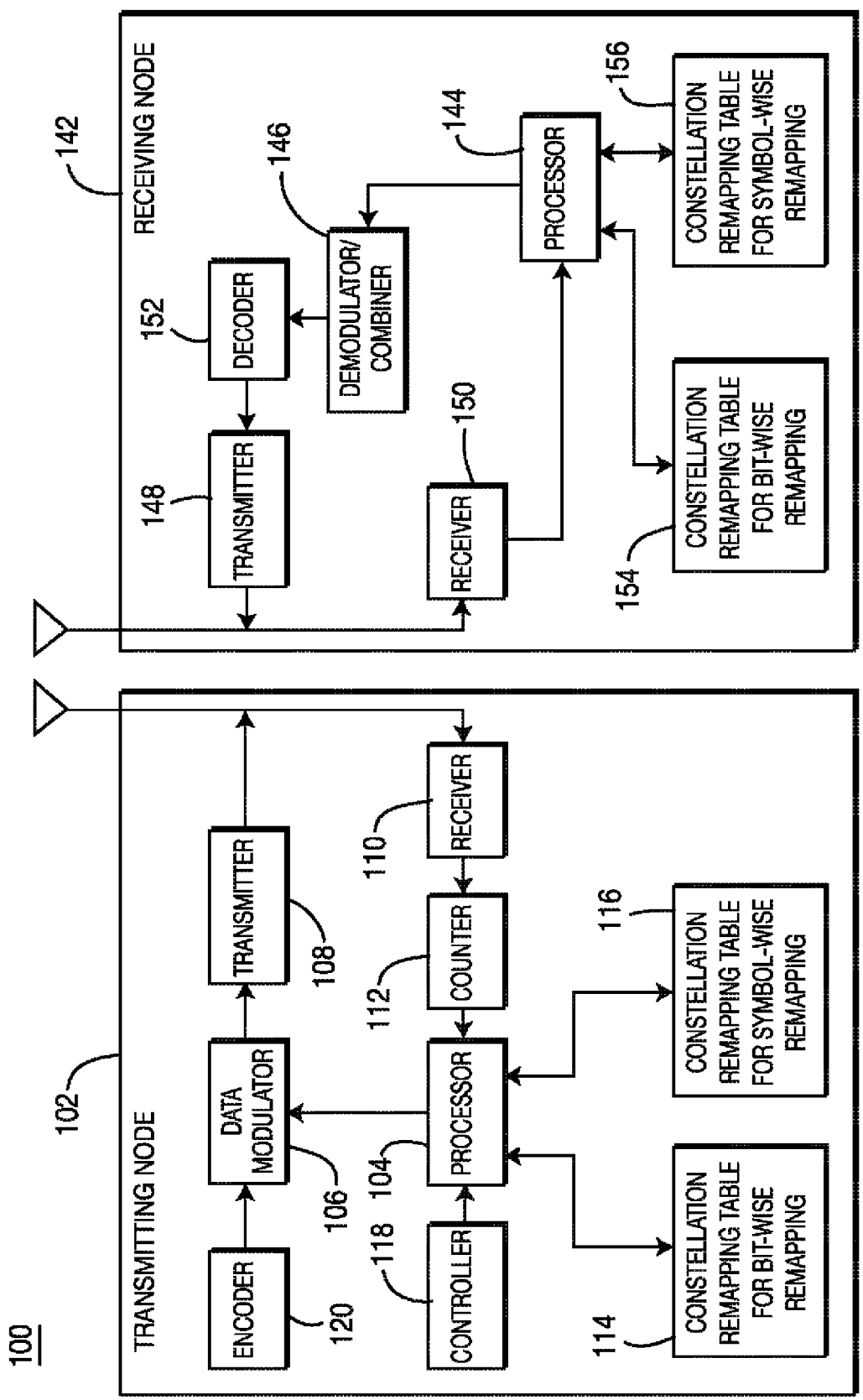
FIG. 1 is an exemplary block diagram of a wireless communication system configured in accordance with the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

FIG. 1 is an exemplary block diagram of a wireless communication system 100 configured in accordance with the present invention. The system includes a transmitting node 102 and a receiving node 142 configured for digital data modulation. The transmitting node 102 and the receiving node 142 communicate via a wireless communications link.

As shown in FIG. 1, the transmitting node 102 includes a processor 104, a data modulator 106, a transmitter, 108, a receiver 110, a transmission number counter 112, a constellation table for bit-wise constellation remapping 114, a constellation table for symbol-wise constellation remapping 116, a controller 118, and an encoder 120.

The processor 104 is configured to implement a plurality of QAM signal constellation remapping techniques. In a preferred embodiment, the processor 104 implements a simplified symbol-wise QAM signal constellation remapping scheme for data packet retransmissions that takes advantage of the separable I and Q labeled bits in QAM signals.

The data modulator 106 is configured to map at least one incoming encoded bit sent from an encoder 120 into one point in a QAM constellation. The processor 104 is configured to select and store the signal constellation used by the data modulator 106. The data modulator 106 is configured to convert each encoded bit sent by the encoder 120 into a QAM symbol according to the signal constellation selected by the processor 104.

According to the coding rate of an incoming data bit stream, the processor 104 is configured to select between using a constellation table for bit-wise constellation remapping 114 and a constellation table for symbol-wise constellation remapping 116. If the coding rate of the incoming bit stream from the encoder 120 is higher than a predetermined threshold, then the processor 104 selects the constellation table for symbol-wise constellation remapping 116. If the coding rate of the incoming bit stream from the encoder 120 fails to exceed the predetermined threshold, then the processor 104 selects the constellation table for bit-wise constellation remapping 114.

The constellation table for bit-wise constellation remapping 114 and the constellation table for symbol-wise constellation remapping 116 consists of a set of constellations corresponding to different modulation types (e.g. 16 QAM and 64 QAM).

The processor 104 is configured to select a signal constellation to be used by the data modulator 106 according to a current transmission number. The signal constellation is uniquely defined by a mapping rule. The processor 104 may select a different constellation table 114, 116 for each transmission identifier number.

The transmitter 108 is configured to upconvert and transmit a mapped QAM symbol 122 to the receiver 150 in the receiving node 142. The receiver 110 is configured to receive an acknowledgement (ACK) signal or a non-acknowledgement (NACK) signal from the receiving node 142 after each transmission. An ACK indicates that the receiving node 142 successfully received the data packet transmission. A NACK indicates that a retransmission of the data packet is required because the receiving node 142 did not successfully receive the transmission.

The receiver 110 of the transmitting node 102 is configured to receive ACK/NACK signals from the receiving node 142. In a preferred embodiment, the processor 104 is configured to instruct the data modulator 106 to remap encoded bits from the encoder 120 into QAM signals according to a newly selected constellation. The processor 104 is configured to instruct the transmitter 108 to retransmit the data packet when the receiver 110 fails to receive an ACK signal during a predetermined period after transmitting the data packet. The processor 104 is further configured to instruct the data modulator 106 to remap the encoded bits into QAM symbols according to a newly selected configuration and to instruct the transmitter 108 to retransmit the data packet when the receiver 110 receives a NACK signal after transmitting the data packet.

The transmission number counter 112 is configured to receive an ACK/NACK signal detected by the receiver 110. In a preferred embodiment, the transmission number counter 112 is incremented by one for each received NACK signal and the transmission number counter 112 is set to one for each ACK signal received. The output of the transmission number counter indicates the number of transmissions for a current data packet. For example, a one indicates a new transmission for a data packet and a two indicates the first retransmission of a data packet. The processor 104 may be configured to use the output of the transmission number counter 112 to determine the signal constellation used by the data modulator 106.

The data modulator 106 is configured to use a common mapping rule, $\mu_m$, for both I and Q components of received encoded bits. The subscript m represents an $m^{th}$ data packet transmission. According to the common mapping rule, $\mu_m$, each point in a signal constellation is uniquely associated with a bit sequence.

The data modulator 106 supports 16 QAM, 64 QAM, and higher signal constellation remapping. The data modulator 106 also supports other types of modulation such as quadrature phase-shift keying (QPSK).

As an informative example, in a 16 QAM signal constellation each point is uniquely associated with a bit sequence $\{i_1 q_1 i_2 q_2\}$. The data modulator 106 maps the bit sequence $\{i_1 q_1 i_2 q_2\}$ into a point with an x-y coordinate of $(\mu_m(i_1 i_2), \mu_m(q_1 q_2))$. The following can be applied to both I and Q labeled bits because the components are separated even though only I labeled bits are further discussed.

In a preferred embodiment, two distinct bit-pairs $\{i_1 i_2\}$ and $\{i'_1 i'_2\}$ are mapped to two x-coordinates $\mu_m(i_1 i_2)$ and $\mu_m(i'_1 i'_2)$ respectively during an $m^{th}$ data packet retransmission. A combined squared Euclidean distance (CSED) between the distinct bit-pairs is defined as:

$$D(i_1 i_2 \leftrightarrow i'_1 i'_2) = \sum_{m=1}^{M} |\mu_m(i_1 i_2) - \mu_m(i'_1 i'_2)|^2 \qquad \text{Equation (1)}$$

A minimum CSED across all possible bit sequences $\{i_1 i_2\}$ and $\{i'_1 i'_2\}$ is represented as $D_{min}(\{\mu_m\})$ and determined by the mapping rule $\{\mu_m\}$. A CSED value represents the distance between two distinct QAM symbols. If the CSED between two distinct QAM symbols is large, then it is easier to separate the symbols. Since the minimum CSED is the dominant factor in determining the raw bit err rate (BER), maximizing the minimum CSED minimizes raw BER.

In a preferred embodiment, to minimize pair-wise error probability, the mapping rule $\{\mu_m\}$ is designed so the minimum CSED is maximized. The mapping rule $\{\mu_m\}$ that maximizes the minimum CSED is referred to as optimum mapping. The optimum mapping may be found through an exhaustive computer search and is predetermined by both the transmitting node 102 and receiving node 142.

Still referring to FIG. 1, the receiving node 142 includes a processor 144, a demodulator/combiner 146, a transmitter 148, a receiver 150, a decoder 152, a constellation remapping table for bit-wise remapping 154, and a constellation remapping table for symbol-wise remapping 156.

The processor 144 in the receiving node 142 is configured to receive control signal information from the receiver 150. This control signal information may include a coding rate, a modulation type, and/or the transmission number of the received data packet transmission. The processor 144 is configured to select a signal constellation from the constellation remapping tables 154, 156 according to the coding rate, the modulation type, and/or the transmission number of the received data packet transmission. The selected signal constellation matches the signal constellation used at the transmitting node 102.

The processor 144 is further configured to access a constellation remapping table for bit-wise remapping 154 and a constellation remapping table for symbol-wise remapping 156. In both remapping tables 154, 156, I and Q labeled bits are independently mapped to a signal constellation. This independent remapping reduces the complexity of the data demodulation implemented at the receiving node 142.

The demodulator/combiner 146 is configured to convert a received data packet transmission into a coded bit sequence using the selected signal constellation as reference. The demodulator/combiner 146 is configured to combine a current received transmission with all previous transmissions to account for data packet retransmissions.

In a preferred embodiment of data demodulation, the demodulator/combiner 146 is configured to calculate the Euclidian distance between a received signal and each possible signal point of a constellation. Because the I and Q labeled bits are independently mapped, the I and Q labeled bits may be separately demodulated. In M-Order QAM (M-QAM), demodulating I labeled bits requires calculating the square root of M Euclidean distances and demodulating Q labeled bits also requires calculating the square root of M Euclidean distances. However, if I and Q labeled bits are not separated, demodulating the incoming bits requires M Euclidean distances. Therefore, separating incoming bits into I and Q labeled bits reduces the complexity in data demodulation at the receiving node 142.

The decoder 152 is configured to receive a coded bit sequence from the demodulator/combiner 146. The demodulator 152 is configured to use the coded bit sequence to reconstruct information bits and perform a cyclic redundancy check (CRC). The CRC determines whether an ACK signal or a NACK signal is transmitted from the transmitter 148 to the transmitting node 102.

FIG. 2 is an exemplary symbol-wise constellation remapping table 200 which contains a section used for 16 QAM modulation 202 and a section used for 64 QAM modulation 204. FIG. 2 only shows the mapping rules for the I labeled bits implemented by system 100 of FIG. 1. However, the same mapping also applies to the Q labeled bits. Both the 16 QAM modulation section 202 and the 64 QAM modulation section 204 contain multiple constellations with each constellation corresponding to a particular transmission. In FIG. 2, each row is a constellation and the first row corresponding to an initial transmission, the second row corresponding to a second transmission, and so forth.

For each modulation type, 16 QAM or 64 QAM, the mapping rules for each different packet transmission number is listed vertically. In 16 QAM modulation, every four incoming encoded bits are mapped to one signal point. A signal point consists of two I labeled bits and two Q labeled bits. The two I labeled bits determine the x-coordination of the mapped point and the two Q labeled bits determine the y-coordination of the mapped point. Therefore, 16 QAM modulation has four possible x-coordinates 210, 212, 214, 216 for mapping a signal point.

For example, if the value of the two labeled I bits is "11", then the x-coordinate of the mapped signal point is 210 for a first transmission. If this data packet needs to be retransmitted, the x-coordinate of the mapped signal point is 214 for a second transmission, 216 for a third transmission, and 212 for a fourth transmission.

In 64 QAM modulation, every eight incoming encoded bits are mapped to one signal point. A signal point consists of three I labeled bits and three Q labeled bits. The three I labeled bits determine the x-coordination of the mapped point and the three Q labeled bits determine the y-coordination of the mapped point. Therefore, 64 QAM modulation has eight possible x-coordinates 220, 222, 224, 226, 228, 230, 232, 234 for mapping a signal point.

For example, if the value of the three labeled I bits is "111", then the x-coordinate of the mapped signal point is 220 for a first transmission. If this data packet needs to be retransmitted, the x-coordinate of the mapped signal point is 220 for a second transmission, 232 for a third transmission, 226 for a fourth transmission, 226 for a fifth transmission, and 222 for a sixth transmission.

Table 1 compares the minimum CSED values of the simplified symbol-wise 64 QAM signal constellation remapping shown in FIG. 2 and a simple repetitive retransmission scheme. The expected gain in terms of raw bit error rate (BER) of each retransmission is predicted according to the minimum CSED value.

TABLE 1

| Number of retransmissions | Simple Repetitive Retransmission | Simplified Symbol-wise QAM Signal Constellation Remapping Scheme | Expected Gain (dB) |
|---|---|---|---|
| 1st | 4 | 4 | 0 |
| 2nd | 8 | 32 | 6 |
| 3rd | 12 | 56 | 6.7 |
| 4th | 16 | 112 | 8.4 |
| 5th | 20 | 156 | 8.9 |
| 6th | 24 | 208 | 9.4 |

A symbol-wise remapping scheme optimizes the performance of uncoded systems or systems with a high coding rate. In contrast, a bit-wise remapping scheme optimizes the performance of systems with a low coding rate. A bit-wise remapping is achieved by changing the order of a bit sequence and/or using the inverse value of some or all of the bits in a bit sequence.

Table 2 is an example of a bit-wise remapping rule. The same mapping rule applies to both I and Q labeled bits. After a first transmission, the remapping rule cyclic shifts the I or Q labeled bits to the left by one for a second transmission and cyclic shifts the I or Q labeled bits to the left by two for a third transmission. In a fourth transmission, the second and third bits are inversed. A fifth and sixth transmission cyclic shifts the I or Q labeled bits as to the left by one and to the left by two, respectively, and also inverses the second and third bit.

TABLE 2

| Transmission Number | Remapping |
|---|---|
| 1 | $i_1 i_2 i_3$ |
| 2 | $i_2 i_3 i_1$ |
| 3 | $i_3 i_1 i_2$ |
| 4 | $i_1 \overline{i_2} \overline{i_3}$ |
| 5 | $i_2 \overline{i_3} \overline{i_1}$ |
| 6 | $i_3 \overline{i_1} \overline{i_2}$ |

A bit-wise remapping scheme performs better than symbol-wise remapping when a coding rate is low. Whereas, a symbol-wise remapping scheme performs better when a coding rate is high. Wireless communication systems widely employ adaptive coding schemes where a coding rate is adapted according to factors such as channel conditions. Therefore, to achieve optimum performance across various coding rates, it is desirable to switch constellation remapping schemes according to a coding rate in real time.

FIG. 3 is a flow diagram of an adaptive QAM signal constellation remapping process 300 implemented by the system 100 of FIG. 1. The remapping process 300 is implemented by both the transmitting node 102 and receiving node 142.

In step 302, the current channel coding information is received. In a transmitting node 102, the current channel coding information is received via explicit signaling. A channel information signal is transmitted from the controller 118 to the processor 104.

In a receiving node 142, the current control signal information is extracted from a received transmission. A control signal includes channel coding information, a modulation type, and a transmission number of a current received transmission. A control signal can be decoded because a fixed modulation and coding is applied to the control signal. After a control signal is decoded, channel coding information, a modulation type, and a transmission number of a current received transmission is sent to the processor 144.

In step 304, the processor 104, 144 determines whether a channel coding rate satisfies a predetermined threshold. In a preferred embodiment, the processor 104, 144 determines whether the system 100 employs strong channel coding or weak channel coding depending on the coding rate used by the current data packet.

In step 306, the processor 104, 144 selects a remapping table for the current data packet. Each data packet may be transmitted multiple times and each transmission uses the same remapping table. However, each transmission may require a different constellation.

If the coding rate of the current data packet is higher than a predetermined threshold, the processor 104, 144 selects a symbol-wise remapping table and applies symbol-wise signal constellation remapping for data packet retransmissions. When the system 100 is uncoded or employs weak channel coding, a symbol-wise constellation remapping technique is preferred.

If the coding rate of the current data packet is lower than a predetermined threshold. The processor 104, 144 selects a bit-wise remapping table and applies bit-wise signal constellation remapping for data packet retransmissions. When the system 100 employs strong channel coding, a bit-wise constellation remapping technique is preferred.

In an alternative embodiment, the predetermined threshold may be dependent on the channel coding type used by the system 100. For example, the predetermined threshold may be set between ⅔ and ¾ when a turbo code is used and a threshold may be lower and set between ½ and ⅔ when a convolution code is used.

In step 308, the processor 104, 144 selects a section of the selected constellation remapping table to be applied is determined according to the modulation type of the current data packet. For example, if 16 QAM modulation is used by the current data packet, then the 16 QAM section of the remapping table is applied. In the transmitting node 102, the modulation type of the current data packet transmission is signaled from the controller 118 to the processor 104. In the receiving node 142, the modulation type of the current data packet is embedded in the control signal.

In step 310, the processor 104, 144 selects a signal constellation is selected according to the transmission number of the current data packet transmission. In the transmitting node 102, the transmission number of the current data packet transmission is determined by the transmission number counter 112 and signaled to the processor 104. The transmission number counter 112 is configured to count the number of received ACK/NACK signals at the transmitting node 102. In the receiving node 142, the transmission number of the current data packet transmission is embedded in the control signal.

The system 100 in accordance with the present invention implements a remapping scheme that adapts to a channel coding rate to achieve optimum performance. The system 100 implements a bit-wise remapping technique when strong channel coding is used and a symbol-wise remapping technique when weak channel coding is used. A wireless channel condition determines whether a strong channel coding or a weak channel coding is used. A weak channel coding is preferred in good channel conditions to increase data throughput. A strong channel coding is preferred in poor channel conditions where strong error correcting ability is required to ensure reliable wireless communications.

The system 100 sets a predetermined channel coding rate threshold to determine when the current channel coding is considered relatively strong or relatively weak. In a preferred embodiment, the predetermined channel coding rate threshold is determined according to a channel coding type used by the system 100.

The features of the present invention may be incorporated into an integrated circuit (IC) or configured in a circuit comprising a multitude of interconnecting components.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for adaptively selecting a signal constellation for data modulation and demodulation during data packet retransmissions, the method comprising:

receiving a data signal including channel coding information extracted from a received retransmission of a current data packet;

determining whether a channel coding rate is higher than a predetermined channel coding threshold;

adaptively switching between bit-wise and symbol wise signal constellations;

adaptively selecting a signal constellation for data modulation based on whether the channel coding rate is higher than the predetermined threshold; and selecting a constellation remapping table according to a modulation type of the current data packet transmission.

2. The method of claim 1 further comprising selecting a signal constellation according to a transmission number of the current data packet transmission.

3. The method of claim 1 wherein the signal constellation is selected from a bit-wise constellation remapping table when the channel coding rate is lower than the predetermined channel coding threshold thereby indicating a strong channel coding.

4. The method of claim 1 wherein the signal constellation is selected from a symbol-wise remapping table when the channel coding rate is higher than the predetermined channel coding threshold thereby indicating a weak channel coding.

5. The method of claim 1 wherein the data modulation uses a 16 quadrature amplitude modulation (QAM) constellation mapping.

6. The method of claim 1 wherein the data modulation uses a 64 quadrature amplitude modulation (QAM) constellation mapping.

7. The method of claim 1 wherein the transmitting node is a wireless transmit/receive unit (WTRU).

8. The method of claim 1 wherein the transmitting node is a base station.

* * * * *